(12) United States Patent
Sanders et al.

(10) Patent No.: US 12,434,959 B2
(45) Date of Patent: Oct. 7, 2025

(54) FUEL DELIVERY SYSTEM HAVING A HOSE END VALVE

(71) Applicant: Marshall Excelsior Co., Marshall, MI (US)

(72) Inventors: Jonathan W. Sanders, Portage, MI (US); Jeffrey A. Brown, Laingsburg, MI (US); James C. Zuck, Marshall, MI (US)

(73) Assignee: Marshall Excelsior Co., Marshall, MI (US)

(*) Notice: Subject to any disclaimer, the term of this patent is extended or adjusted under 35 U.S.C. 154(b) by 266 days.

(21) Appl. No.: 18/131,178

(22) Filed: Apr. 5, 2023

(65) Prior Publication Data

US 2023/0322544 A1  Oct. 12, 2023

Related U.S. Application Data (60) Provisional application No. 63/327,844, filed on Apr. 6, 2022.

(51) Int. Cl.
*B67D 7/04* (2010.01)
*F16K 37/00* (2006.01)

(52) U.S. Cl.
CPC ........ *B67D 7/0401* (2013.01); *F16K 37/0041* (2013.01); *B67D 2007/0421* (2013.01); *B67D 2007/0444* (2013.01)

(58) Field of Classification Search
CPC ........... F16K 37/0041; F16K 31/52408; F16K 31/602; B67D 2007/0444; B67D 7/12; B67D 7/221; B67D 2007/329; B67D 7/348; B67D 7/3474; B67D 2205/0329; F17C 2250/0329; F17C 2250/032; F17C 2250/034; F17C 2250/036; F17C 2250/0478; F17C 13/02
See application file for complete search history.

(56) References Cited

U.S. PATENT DOCUMENTS

| | | | |
|---|---|---|---|
| 6,763,974 B1 * | 7/2004 | Shermer | B67D 7/36 222/40 |
| 7,766,039 B2 | 8/2010 | Zuck | |
| 8,113,240 B2 | 2/2012 | Blanchard et al. | |
| 8,132,639 B2 | 3/2012 | Zuck et al. | |
| 8,752,586 B2 | 6/2014 | Blanchard et al. | |
| 9,310,003 B2 | 4/2016 | Blanchard et al. | |
| 9,334,992 B2 | 5/2016 | Blanchard et al. | |
| 9,874,293 B2 | 1/2018 | Blanchard et al. | |
| 9,976,683 B2 | 5/2018 | Blanchard et al. | |
| 2018/0335790 A1 * | 11/2018 | Imsland | F16K 37/0041 |
| 2020/0271240 A1 * | 8/2020 | Kuhn | F16K 17/16 |

* cited by examiner

*Primary Examiner* — Kelsey E Cary
(74) *Attorney, Agent, or Firm* — Neal, Gerber & Eisenberg LLP (57) ABSTRACT

A fuel delivery system and method for controlling a fuel delivery system includes a fuel control device including a valve and an electronic sensor assembly integrated to the fuel control device and is arranged to detect an operational positioning of the valve, to generate a record of the real-time activation of the valve, and to compare records of real-time activation against a schedule of fuel deliveries to detect unauthorized fuel access.

10 Claims, 6 Drawing Sheets

FUEL DELIVERY SYSTEM HAVING A HOSE END VALVE

CROSS-REFERENCE TO RELATED APPLICATION(S)

The present invention claims priority to and the benefit of U.S. Provisional Patent Application Ser. No. 63/327,844, filed Apr. 6, 2022, which is hereby incorporated by reference in its entirety.

BACKGROUND OF THE INVENTION

1. Field of the Invention

The present disclosure relates to fuel delivery systems having a hose end valve and, more specifically, to a fuel delivery system having a hose end valve with an electronic sensor to sense a position of a seal body relative to a main seal.

2. Description of the Related Art

Hoses are used in the transfer of fluids, such as liquified petroleum gas (LP) or other refined fuel products, to and from vehicles or storage tanks designed to carry or hold such liquids or gases. A number of vehicles, such as forklift trucks, operate on propane, LP, or other gases, that are stored in a fuel tank on a mobile vehicle. These fuel tanks require refilling periodically, typically from a large fixed or mobile storage tank equipped with hoses having hose end valves adapted to interface with the fuel tank for refilling and control the flow of fluid into or out of the storage tank.

In certain operations, the storage tank may be provided in a location convenient to the refilling of vehicles, but distant from other operations and without persistent monitoring. The storage tank may be susceptible to tampering or the stored fluid susceptible to theft. Conventional site security systems may by expensive and complex, involving security cameras or additional personnel. Therefore, there is an opportunity to provide improved fuel delivery systems and hose end valves in accordance with the present disclosure below by incorporating a sensor to sense the position of the valve and create a record of valve opening events so that a site operator may know when the valve is being opened and whether unauthorized access has occurred.

SUMMARY OF THE INVENTION

Accordingly, the present invention provides a fluid control device including a housing defining an inlet, an outlet, and a fluid flow pathway extending between the inlet and the outlet, a valve disposed within the housing for selectively controlling fluid flow between the inlet and the outlet, and an electronic sensor assembly integrated with the housing, the electronic sensor assembly arranged to detect an operating position of the valve.

Further, the present invention provides a fuel delivery system including a supply tank, a hose in fluid communication with the supply tank, a fluid control device in fluid communication with the hose and disposed at an end of the hose opposite the supply tank, and wherein the fluid control device comprises a valve for selectively controlling fluid flow through the fluid control device and an electronic sensor assembly detecting an operating position of the valve.

In addition, the present invention provides a method of controlling a fuel delivery system including steps of detecting, with an electronic sensor assembly integrated to a fluid control device, an actuation of the fluid control device, automatically generating, with the electronic sensor assembly, a first data record representing a real-time event of the actuation of the fluid control device, storing, with the electronic sensor assembly, the first data record, wherein the fluid control device comprises a valve arranged to selectively dispose a seal body in contact with a main seal in a closed configuration and selectively dispose the seal body spaced apart from the main seal in an open configuration and wherein the electronic sensor assembly is arranged to detect a positioning of the seal body relative to the main seal.

One advantage of the present invention is that a new fuel delivery system having a hose end valve and method of controlling a fuel delivery system is provided. Another advantage the fuel delivery system and method incorporates a sensor to sense a position of the valve and create a record of valve opening events so that a site operator may know when the valve is being opened and whether unauthorized access has occurred.

Other features and advantages of the present invention will be readily appreciated, as the same becomes better understood, by reference to the following detailed description, when considered in connection with the accompanying drawings

DETAILED DESCRIPTION

Figure 1:
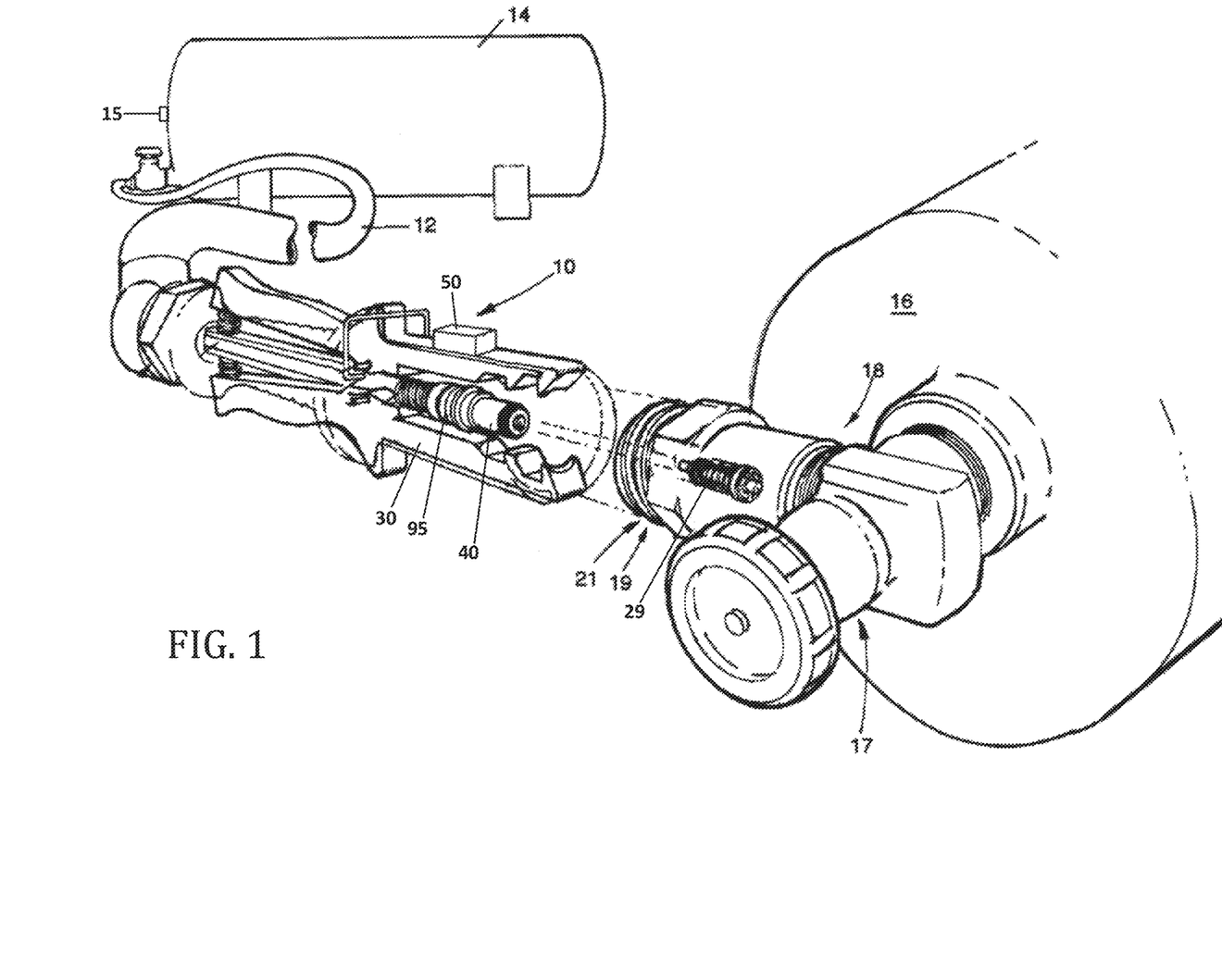
FIG. 1 is a perspective view of a hose end valve incorporating an electronic sensor connected to a fuel supply tank and a destination tank in a partial cut-away view to illustrate interior components in a first example arrangement.

In accordance with the present disclosure, a connector 10 is shown in FIG. 1 attached to a fuel supply hose 12 that is attached in turn to a supply tank 14. The supply tank 14 may be a fixed storage tank, as shown in FIG. 1, or may be a mobile supply tank mounted on a delivery truck or other vehicle. The supply tank 14 may store fuel, such as propane or other liquified petroleum product. The supply tank 14 may be arranged to supply fuel to, for example, a fuel tank or canister 16, which may be mounted on a vehicle for use in the vehicle's operation.

The fuel tank 16 may include a service valve 17 threaded into an internally threaded collar at an opening of the fuel tank 16. The service valve 17 includes a threaded interface 18 opposite the fuel tank 16 which may be arranged to interface with various connectors, adapters, or couplers for communicating fluid into or out of the fuel tank 16. In one example, as illustrated in FIG. 1, the fuel tank 16 is provided with an adapter fitting 19 having an externally-threaded annular body 21. The connector 10 may be a quick connect fuel connector, such as is disclosed in U.S. Pat. No. 7,766,039, entitled Quick Connect Fuel Hose Connector, issued Aug. 3, 2010, the entirety of which is incorporated by reference herein.

The connector 10 includes a body 30 to interface and secure to the adapter fitting 19. The flow of fluid through the connector 10 is controlled through a connector outlet valve 40. When the connector 10 is secured to the adapter fitting 19, the outlet valve 40 is actuated by an adapter valve 29, causing the outlet valve 40 to move relative to the body 30 of the connector 10, and allowing fluid to flow through the hose 12 from the supply tank 14 to the fuel tank 16. In order to detect and record actuation of the connector 10 in this manner, the connector 10 includes an electronic sensor assembly 50 to detect this movement of the outlet valve 40 relative to the body 30. The electronic sensor assembly 50 is described in additional detail below.

Figure 2:
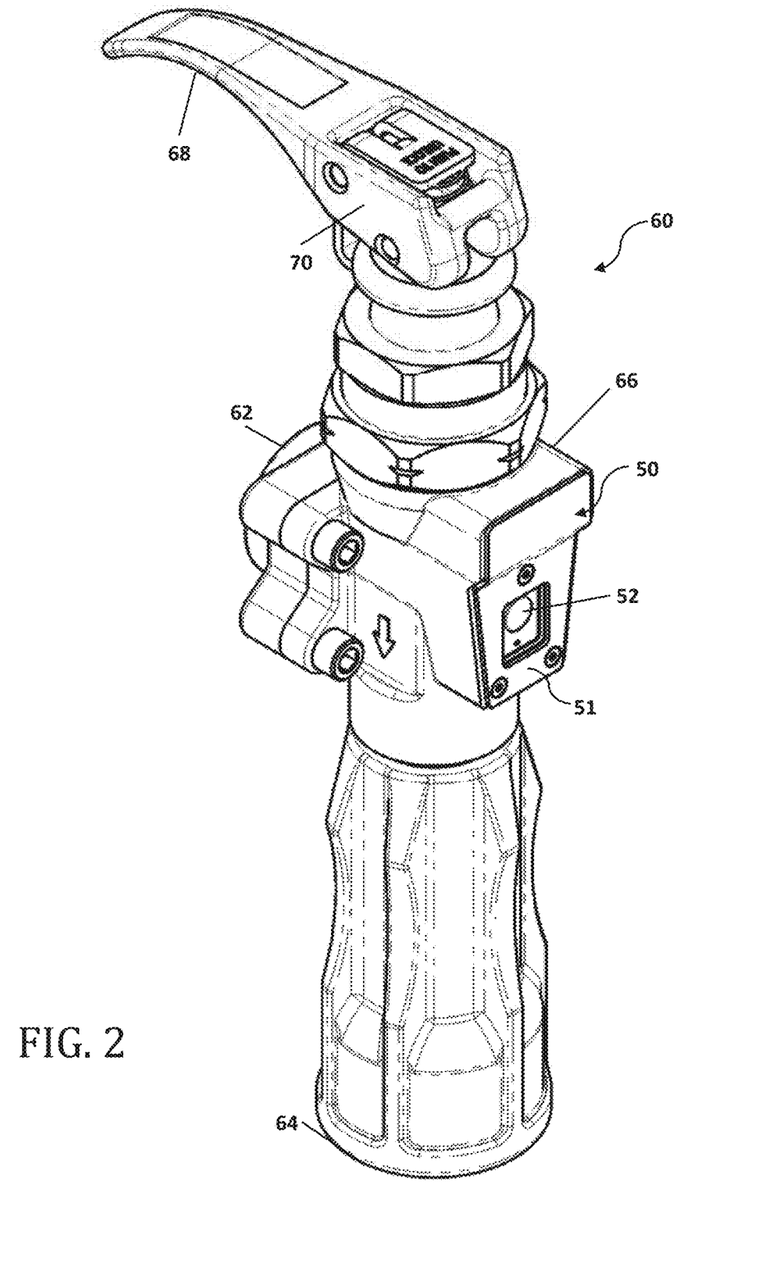
FIG. 2 is a perspective view of a hose end valve incorporating an electronic sensor.

In another exemplary arrangement, as shown in FIG. 2, a fluid control device such as a hose end valve 60 is illustrated in a perspective view. The hose end valve 60 includes an inlet 62 adapted for connection to a fluid hose, such as the hose 12. The hose end valve 60 includes an outlet 64 adapted for connection to a fuel tank via, for example, the service valve 17 or adapter 19. The hose end valve 60 includes a handle 68 for manually controlling fluid flow through the hose end valve 60 between an opened configuration allowing fluid flow through the hose end valve 60 and a closed configuration where fluid flow is prevented. The handle 68 may be retained in the closed position by a spring latch 70 that must be disengaged before the handle 68 can be used to open the hose end valve 60. The hose end valve 60 includes an electronic sensor assembly 50. The electronic sensor assembly 50 may be integrated with a valve housing 66 of the hose end valve 60. A removable cover 51 may enclose the electronic sensor assembly 50 and facilitate the replacement of a power source or service of components making up the electronic sensor assembly 50.

Figure 3:
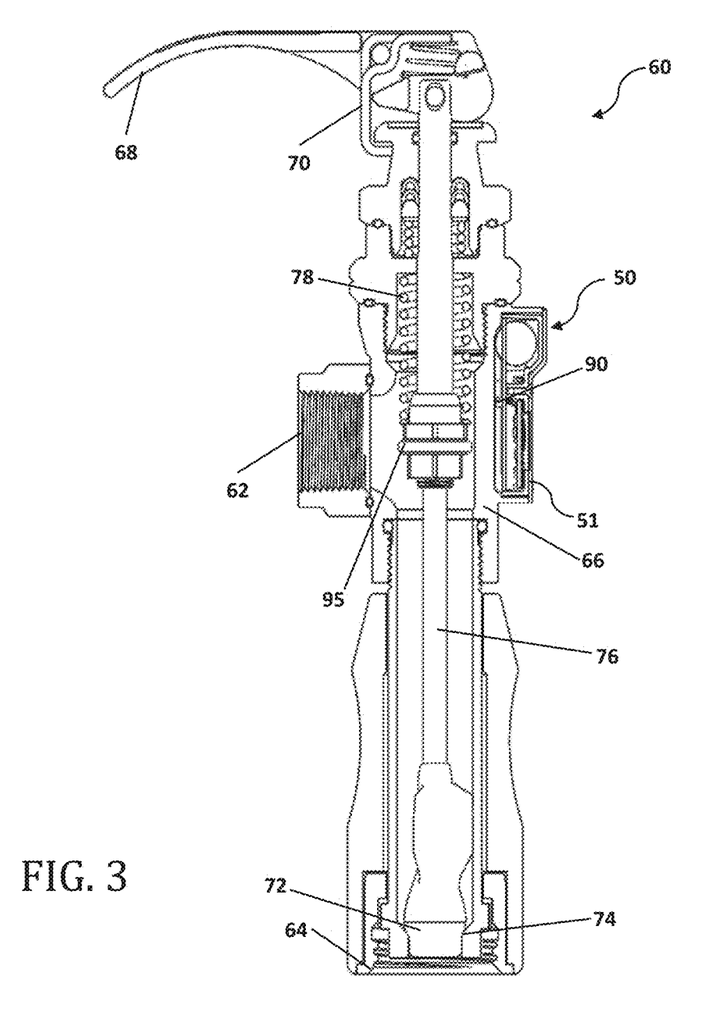
FIG. 3 is a side cut-away view of a second hose end valve incorporating an electronic sensor in a second example arrangement in a closed configuration.

The hose end valve 60 shown in FIG. 2 is illustrated in FIG. 3 in a cross-sectional view in a first, closed configuration. Between the inlet 62 and the outlet 64 the hose end valve 60 defines a fluid chamber within the valve housing 66. Within the fluid chamber defined within the valve housing 66, a seal body 72 seals against a main seal 74 for selectively allowing or preventing fluid flow through the hose end valve 60. The seal body 72 is supported on a valve stem 76 for movement relative to the valve housing 66. The main seal 74 may be integrated to or formed as part of the valve housing 66. Extending the handle 68 opens the hose end valve 60 by retracting the seal body 72 from the main seal 74, the seal body 72 being mounted to the valve stem 76 that extends between the handle 68 and the seal body 72. A spring 78 may be disposed on the valve stem 76 to urge the seal body 72 toward the closed position. When the seal body 72 is disposed adjacent the main seal 74, the fluid flow pathway between the inlet 62 and the outlet 64 is blocked and no fluid flows.

Figure 4:
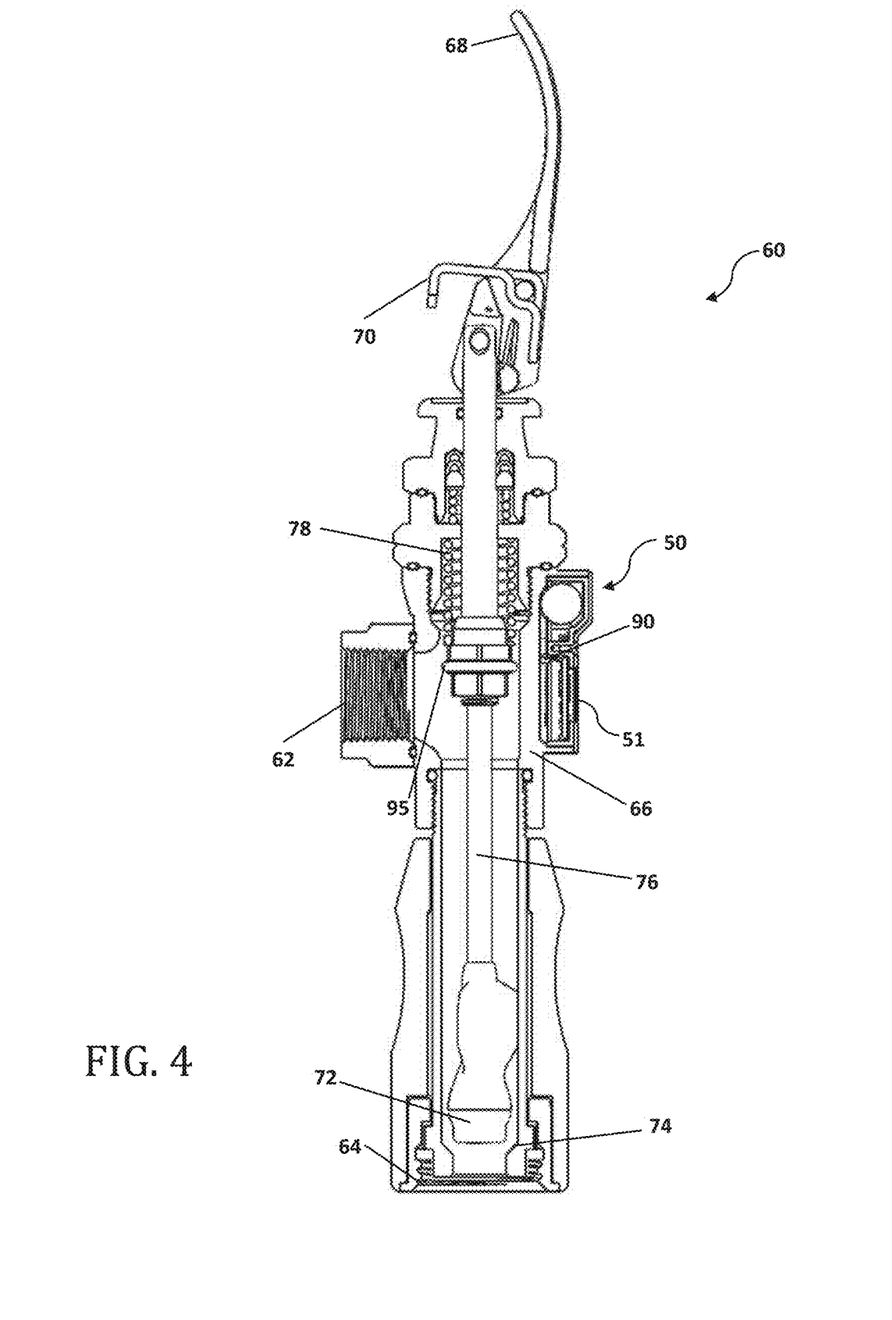
FIG. 4 is a side cut-away view of a second hose end valve incorporating an electronic sensor in a second example arrangement in an open configuration.

The hose end valve 60 shown in FIG. 2 is illustrated in FIG. 4 in a cross-sectional view in a second, open configuration. In FIG. 4, the spring latch 70 has been disengaged from the valve housing 66 and the handle 68 has been extended. Extending the handle 68 retracts the valve stem 76, compressing the spring 78 and distancing the seal body 72 from the main seal 74. In this second, open configuration shown in FIG. 4, an open fluid flow pathway extends between the inlet 62 and the outlet 64.

Similarly to the connector 10 shown in FIG. 1, the hose end valve 60 shown in FIG. 2 and FIG. 3, includes an electronic sensor assembly 50 for sensing actuation of the hose end valve 60 by detecting movement of the valve stem 76 relative to the valve housing 66. In the illustrated example, a sensor target, such as magnet 95, is supported on the valve stem 76 for movement with the valve stem 76 as the handle 68 is moved between a closed position (shown in FIG. 2) and an open position (shown in FIG. 3). The electronic sensor assembly 50 includes a sensor 90 for detecting a relationship between the magnet 95 and the sensor target supported on the valve stem 76. The sensor 90 may be sensitive to a proximity or distance between the sensor 90 and the sensor target, such as the magnet 95, so that the sensor 90 can be used to detect when the sensor target, such as the magnet 95, is disposed closer to the sensor 90 as in the open configuration, or further from the sensor 90 as in the closed configuration. The sensor 90 may also be used to detect the movement of the sensor target, such as the magnet 95, between the closed configuration and the open configuration.

Figure 5:
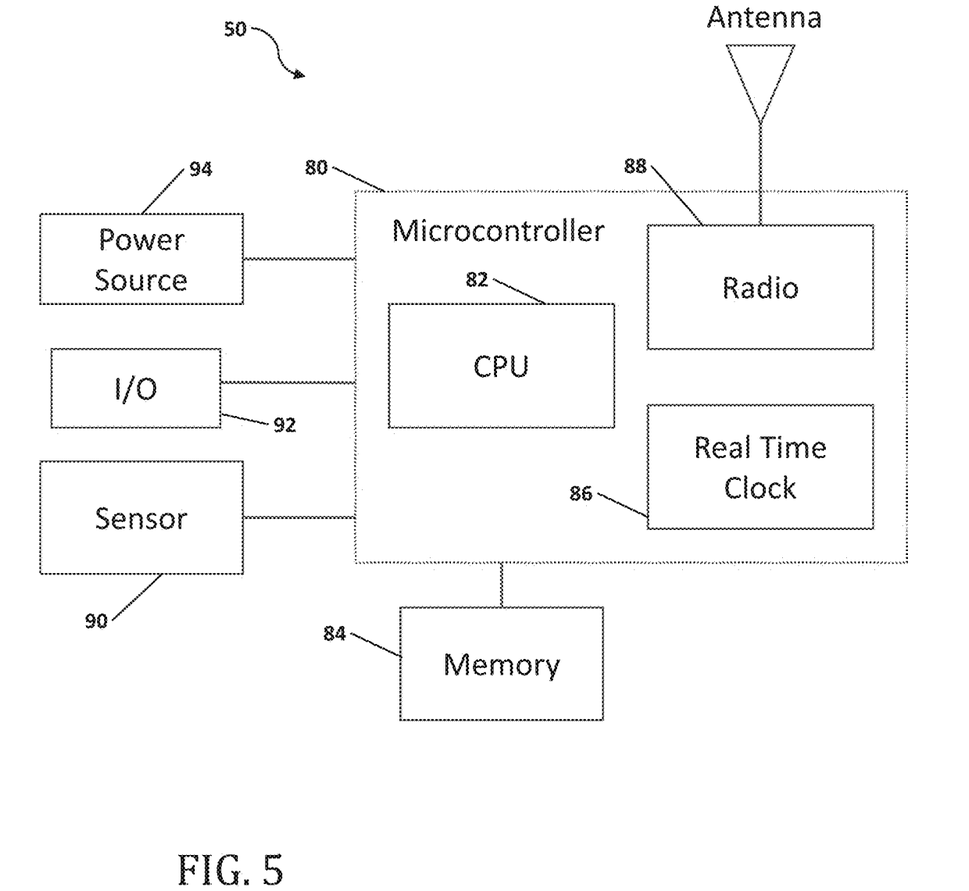
FIG. 5 is a schematic representation of an electronic assembly for a hose end valve incorporating an electronic sensor.

The electronic sensor assembly 50 is illustrated in schematic form in FIG. 5, the entirety of which may be integrated to a fluid control device, such as, for example, connector 10 or hose end valve 60, or the like. The electronic sensor assembly 50 may include a microcontroller 80 having a microprocessor 82, memory 84, a real-time-clock circuit 86, radio transmitter/receiver circuit 88, sensor 90, one or more input or output devices 92, and a power source 94 in electronic communication. The electronic sensor assembly 50 may include one or more printed circuit boards.

The microprocessor 82, which may be referred to as a processor, central processing unit (CPU), or the like, is in electronic communication with the memory 84 and the other components of the electronic sensor assembly 50 for executing instructions and operating the electronic sensor assembly 50. The memory 84 stores data and instructions that when executed by the microprocessor 82 to operate the functions of the electronic sensor assembly 50. The real-time-clock circuit 86 provides a measurement of the passage of time.

The radio 88 may be a Bluetooth radio, a Wi-Fi radio based on the IEEE 802.11 family of standards, a cellular radio for communicating with mobile telephone networks, a near-field communication device, or other telecommunication technology. The electronic sensor assembly 50 includes a power source 94, such as a battery, which may be a button-cell battery, or other battery suitable to power the operations of the electronic sensor assembly 50.

The electronic sensor assembly 50 may include one or more user inputs or outputs. The inputs may include one or more buttons or switches (52, shown in FIG. 2), such as a power switch for turning the device On or Off, a pairing button for initiating or toggling communication between the electronic sensor assembly 50 and an external computing device via the radio 88. The outputs may include one or more indicator lights, such as a multi-color LED light, that can indicate an operating status of the electronic sensor assembly 50. The outputs may include one or more audible devices, such as a buzzer or tone generator, for providing audible feedback to a user.

The electronic sensor assembly 50 includes a sensor 90 for sensing the operation of the fluid control device. The sensor 90 may be a Hall effect sensor that detects the presence and magnitude of a magnetic field using the Hall effect. In the connector 10, as illustrated in FIG. 1, a magnet 95 may be provided on the outlet valve 40 so that as the outlet valve 40 moves relative to the body 30, the motion is detected by the sensor 90. Similarly, in the hose end valve 60, the magnet 95 is provided on the valve stem 76 so that as the valve stem 76 moves relative to the valve housing 66 upon actuation of the handle 68, the motion is detected by the sensor 90.

The electronic sensor assembly 50 may be configured to detect actuation of the fluid control device as the valve 60 is opened based on a signal from the sensor 90 and to store data representing the time of actuation and based on a signal from the real-time-clock circuit. The sensor 90 may generate a further signal when the fluid control device is returned to a closed state, storing data representing the time the valve 60 is closed and calculating a duration for how long the valve 60 was opened.

The electronic sensor assembly 50 may be arranged to retain the stored data until manually collected, for example, during a download process. Where the radio 88 has a limited communication range, an operator may bring a mobile computer, such as a laptop computer, smart phone, or the like, into proximity with the electronic sensor assembly 50 to download the stored data. The operator may press a button on the electronic sensor assembly 50 to initiate a communication session for downloading the stored data. Where the electronic sensor assembly 50 omits the radio 88, or if the radio 88 is or becomes non-functional, the electronic sensor assembly 50 may include a data port (not shown) for wired connection to another computing device for communicating the stored data from the electronic sensor assembly 50. The data port may be normally covered behind the removable cover 51.

The electronic sensor assembly 50 may be arranged to automatically transmit the stored data on a regular schedule, for example to an offsite computing device, such as via a network, or cloud-based resource. Where the radio 88 is capable of longer range communication, such as via a cellular telephone network, the electronic sensor assembly 50 may be configured to automatically upload stored data to a cloud service on a regular schedule, such as once a day, once a week, once a month, or the like. In other alternatives, the electronic sensor assembly 50 may be configured to upload based on a number of actuations of the fluid control device. Where the memory 84 has limited capacity, the electronic sensor assembly 50 may be configured to upload stored data after a predetermined number of valve actuations, such as after fifty (50) actuations, after one hundred (100) actuations, or the like. In this way, the electronic sensor assembly 50 may ensure that memory capacity limitation does not prevent the accurate and complete storage of records.

In one exemplary arrangement, the supply tank 14 may be equipped with or in communication with a controller 15. Where the supply tank 14 is a stationary emplacement, the controller 15 may be a monitoring station that monitors the fill quantity, or other parameters associated with the supply tank 14. Where the supply tank 14 is provided on a truck, the controller 15 may be an integrated fuel delivery system that monitors the parameters of the supply tank 14 and further provides electronic control of valves or pumps associated with the supply tank 14. In some examples, the electronic sensor assembly 50 in communication with the controller 15 via the radio 88. The records of valve actuation are communicated to the controller 15 virtually in real-time as the events occur and are processed by the electronic sensor assembly 50, and the records are not thereafter stored in the memory 84 of the electronic sensor assembly 50.

A fuel delivery system, as shown in FIG. 1, includes a supply tank 14, a hose 12, and a fluid control device, such as connector 10 or hose end valve 60, the fluid control device including an electronic sensor assembly 50. The fuel delivery system may include or may be in communication with a controller 15, which may be associated with the supply tank 14. The electronic sensor assembly 50 may be in electronic data communication with a remote computing device, which may include the controller 15, or alternatively or in addition, a remote network.

Figure 6:
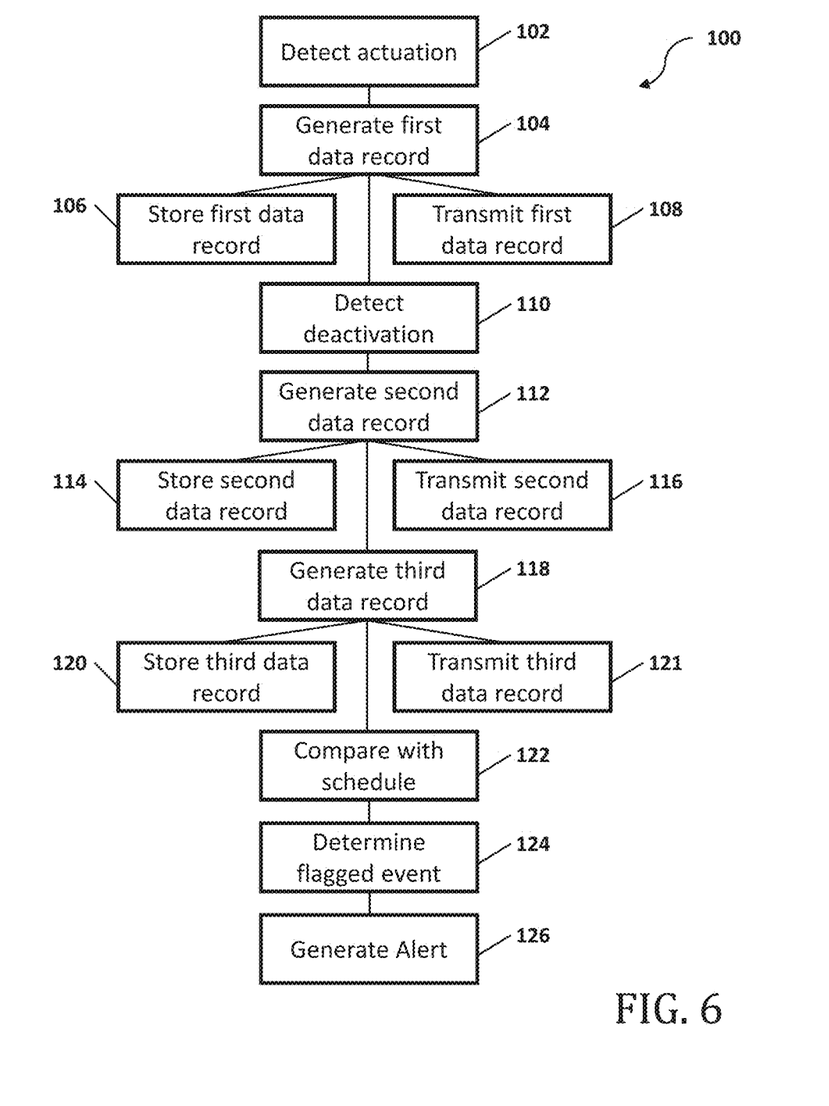
FIG. 6 illustrates a method for controlling a system having a hose end valve incorporating an electronic sensor.

A method 100 of controlling a fuel delivery system is shown in FIG. 6. The method includes detecting, with the electronic sensor assembly 50, an actuation of the fluid control device at step 102. The method 100 includes automatically generating, with the electronic sensor assembly 50, a first data record representing a real-time event of the fluid control device actuation at step 104. The method 100 optionally includes storing, with the electronic sensor assembly 50, the first data record at step 106. The method 100 optionally includes transmitting, with the electronic sensor assembly 50, the first data record to a remote computing device at step 108.

The method 100 optionally includes detecting, with the electronic sensor assembly 50, a deactivation of the fluid control device at step 110. If the deactivation of the fluid control device is detected, the method 100 optionally includes generating, with the electronic sensor assembly 50, a second data record representing a real-time event of the fluid control device deactivation at step 112. The method 100 optionally includes storing, with the electronic sensor assembly 50, the second data record at step 114. The method 100 optionally includes transmitting, with the electronic sensor assembly 50, the second data record to a remote computing device at step 116. The method 100 optionally includes generating a third data record representing a duration of the fluid control device activation at step 118. The third data record may be generated by the controller 15, the electronic sensor assembly 50, or the remote computing device, and may be determined directly from one or more real-time-clock signals or may be calculated based on the first data record and the second data record. The method 100 optionally includes storing the third data record at step 120. The third data record may be stored in the controller 15, the electronic sensor assembly 50, or the remote computing device. The site of data storage may depend on where the third data record was generated. A step 121 of transmitting the third data record may be performed to communicate the third data record between the generating computing device and the storing computing device. The step 121 of transmitting the third data record may happen in conjunction with the transmission of the first or second data records as in step 108 or step 116. Alternatively, the first, second, or third data records may be transmitted separately or sequentially.

The fuel delivery system may store, in the controller 15 or in the electronic sensor assembly 50, or may be in communication with a remote computing device that stores data representing a schedule of fuel deliveries. The method 100 optionally includes comparing one or more of the first data record, the second data record or the third data record with the schedule of fuel deliveries at step 122. The method 100 optionally includes determining, by the controller 15 or the electronic sensor assembly 50, a flagged event as an unscheduled activation of the fuel control device based on a discrepancy between one or more of the first data record, the second data record or the third data record at step 124. The determination of the flagged event may be based on a difference between a scheduled time and the first data record of the fluid control device actuation greater than a predefined threshold. In one example, the predefined threshold may be three (3) hours, six (6) hours, twelve (12) hours, twenty-four (24) hours, or other suitable deviation. The determination of the flagged event may be based on a difference between a scheduled duration and the third data record representative of the duration of real-time activity by greater than a predefined duration threshold. The predefined duration threshold may be 5% of total fill time, 25% of total fill time, 50% of total fill time, or other suitable duration deviation. The determination of a suitable threshold may be based on historical trends. For example, if a schedule of fuel delivery start times and durations is established with respect to a particular fuel supply and consumer, an empirically determined variance may be based on the variability of the historical activity.

The method 100 optionally includes generating an alert in response to determining a flagged event at step 126. The alert may include one or more audible or visible alarms generated by the controller 15 or the electronic sensor assembly 50. Alternatively, the alert may include an alert data record stored in the controller 15 or the electronic sensor assembly 50 for manual retrieval during an auditing process of the fuel delivery system, or for transmittal to an external computing device, for example as an email, text message or the like.

The present invention is provided in an illustrative manner, and it is to be understood that the terminology which has been used is intended to be in the nature of words of description rather than of limitation. Moreover, words of degree or approximation, such as substantially or about, are reflective of real world conditions that do not meet mathematical perfection and are understood to permit deviation consistent with tolerances and allowances customary in the relevant technology. Similarly, words of direction, such as above or below, or distinction, such as first or second, are used in reference to a customary implementation contemplated by the descriptive examples as would be understood by one of skill in the art, and are not intended to be limiting. Where an example is illustrated in one orientation, an opposite orientation should be readily understood as consistent and within the scope of the disclosure unless specifically described as a necessary arrangement. Likewise, reference to a first and a second merely distinguishes between two examples without connoting a particular order, precedence or importance, nor does referencing a first require the presence of a second. Many modifications and variations of the present disclosure are possible in light of the above teaching, and may be practices other than as specifically described.

What is claimed is:

1. A fuel delivery system comprising:
   a supply tank;
   a controller associated with the supply tank;
   a hose in fluid communication with the supply tank;
   a fluid control device in fluid communication with the hose and disposed at an end of the hose opposite the supply tank;
   wherein the fluid control device comprises a valve for selectively controlling fluid flow through the fluid control device and an electronic sensor assembly detecting an operating position of the valve;
   wherein the valve comprises a seal body and a main seal, the valve arranged to selectively dispose the seal body in contact with the main seal in a closed configuration and selectively dispose the seal body spaced apart from the main seal in an open configuration;
   wherein the electronic sensor assembly is arranged to detect the operating position of the seal body relative to the main seal; and
   wherein the controller and the electronic sensor assembly are configured to operate in combination to:
      detect, with the electronic sensor assembly, a valve actuation;
      generate, with the electronic sensor assembly, a first data record representative of a real-time event of the valve actuation; and
      compare, with the controller, the first data record with a data representing a schedule of fuel deliveries.

2. The fuel delivery system of claim 1, wherein the valve comprises a valve stem, the valve stem arranged to selectively dispose the seal body between the closed configuration and the open configuration; a magnet disposed on the valve stem, and wherein the electronic sensor assembly comprises a Hall effect sensor arranged to detect the operating position of the valve based on the magnet.

3. The fuel delivery system of claim 1, wherein the controller is in electronic communication with the electronic sensor assembly.

4. The fuel delivery system of claim 3, wherein the electronic sensor assembly comprises a radio transmitter/receiver circuit, and the controller comprises a radio transmitter/receiver, wherein the controller and the electronic sensor assembly are in radio telecommunication.

5. The fuel delivery system of claim 1, wherein the controller is configured to:
   determine a discrepancy between the first data record and the data representing the schedule of fuel deliveries; and
   generate an alert in response to determining the discrepancy.

6. A method of controlling a fuel delivery system, said method comprising the steps of:
   detecting, with an electronic sensor assembly integrated to a fluid control device, an actuation of the fluid control device;
   automatically generating, with the electronic sensor assembly, a first data record representing a real-time event of the actuation of the fluid control device;
   storing, with the electronic sensor assembly, the first data record;
   detecting, with the electronic sensor assembly, a deactivation of the fluid control device;
   automatically generating with the electronic sensor assembly, a second data record representing a real-time event of the fluid control device;
   storing, with the electronic sensor assembly, the second data record;
   generating a third data record representing a duration of fluid control device activation;
   storing, with the electronic sensor assembly, the third data record; and
   comparing one of the first data record, the second data record, or the third data records with a data representing a schedule of fuel deliveries;
   wherein the fluid control device comprises a valve arranged to selectively dispose a seal body in contact with a main seal in a closed configuration and selectively dispose the seal body spaced apart from the main seal in an open configuration and wherein the electronic sensor assembly is arranged to detect a positioning of the seal body relative to the main seal.

7. The method of claim 6, including the step of transmitting, with the electronic sensor assembly, the first data record to a remote computing device.

8. The method of claim 6, including the step of transmitting, with the electronic sensor assembly, the second data record to a remote computing device.

9. The method of claim 6, including the step of determining a flagged event as an unscheduled activation of the fluid control device based on a discrepancy between the one of the first data record, the second data record, or the third data record and the data representing the schedule of fuel deliveries, and generating an alert in response to determining the flagged event.

10. The method of claim 9, wherein the alert is one of an audible alarm or a visible alarm.

* * * * *